United States Patent [19]

Rabatin

[11] 4,208,470
[45] Jun. 17, 1980

[54] X-RAY INTENSIFYING SCREEN
[75] Inventor: Jacob G. Rabatin, Chardon, Ohio
[73] Assignee: General Electric Company, Schenectady, N.Y.
[21] Appl. No.: 957,543
[22] Filed: Nov. 3, 1978
[51] Int. Cl.² ............................................. C09K 11/46
[52] U.S. Cl. .................................. 428/328; 250/483; 252/301.4 H; 428/403; 428/539
[58] Field of Search .................. 252/301.4 H; 427/68, 427/215; 428/403, 539, 328; 250/483

[56] References Cited

U.S. PATENT DOCUMENTS

| | | |
|---|---|---|
| 3,023,313 | 2/1962 | DeLaMater et al. . |
| 3,070,435 | 12/1962 | Reusser et al. . |
| 3,617,743 | 11/1971 | Rabatin et al. . |
| 3,690,929 | 9/1972 | Yokota et al. ........................ 427/215 |
| 3,795,814 | 3/1974 | Rabatin . |
| 4,138,361 | 2/1979 | Suys et al. ................. 252/301.4 H X |

FOREIGN PATENT DOCUMENTS 999780  7/1965  United Kingdom .

*Primary Examiner*—Jack Cooper
*Attorney, Agent, or Firm*—John F. McDevitt; Lawrence R. Kempton; Philip L. Schlamp

[57] ABSTRACT

Improved performance of rare earth oxyhalide phosphors and X-ray image intensifying screens may be realized by admixing a small but effective amount of particular trivalent antimony compounds with the phosphor prior to screen preparation. If the phosphor powder is washed with an aqueous solution of said additive still further improvements are derived.

5 Claims, 1 Drawing Figure

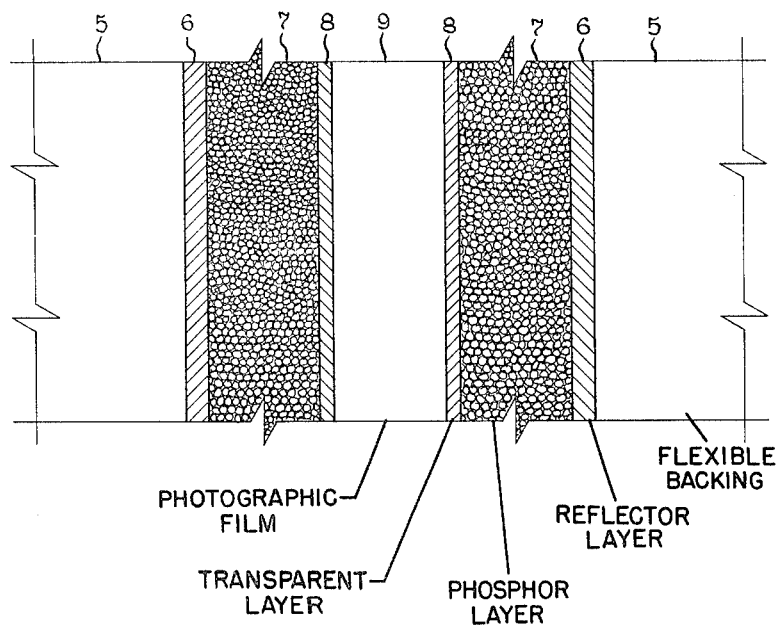

X-RAY INTENSIFYING SCREEN

RELATED PATENT APPLICATIONS

In my co-pending patent application, Ser. No. 951,464, filed Oct. 16, 1978, and assigned to the present assignee, there is described and claimed a particular class of inorganic salt additives for improving the emission brightness of rare earth oxyhalide phosphors when used in X-ray screens. Organic additives to said phosphor materials are described and claimed in another co-pending patent application, Ser. No. 951,463, filed Oct. 16, 1978, which provide greater improvements in retaining the original emission brightness of said phosphors for X-ray screen products.

BRIEF DESCRIPTION OF THE PRIOR ART

Rare earth oxyhalides have been employed as phosphors for X-ray image converters for some time. The structure of a multi-layer intensifier screen utilizing such phosphors is disclosed in U.S. Pat. No. 3,936,644 to the present inventor. The process for producing rare earth oxyhalides is disclosed in U.S. Pat. No. 3,591,516 also to the present inventor. Various X-ray image converter devices utilizing rare earth oxyhalide phosphors are disclosed and claimed in further U.S. Pat. Nos. 3,617,743 and 3,795,814 of the present inventor. In this mentioned prior art, oxyhalides of lanthanum gadolinium are disclosed in conjunction with phosphor activating elements. Two specific phosphors commercially available are LaOBr:Tb and LaOBr:Tm. In normal environmental situations, special moisture reducing provisions need not be implemented to protect the phosphor component of an X-ray image converter device. However, in humid climates moisture has a deleterious effect upon the phosphor material so that special environmental controls, such as air conditioning and dehumidification are necessary in places where such devices as X-ray screens are stored, used and processed. As will be appreciated, in many places such rigorous environmental control is not possible. Accordingly, it is desirable to prepare the phosphor material itself to be moisture resistant.

An entirely different problem is encountered during use of such X-ray image intensifier screens and which is attributable to discoloration of the phosphor layer by volatile orgaic constituents escaping from an associated photographic film. Specifically, the photographic film that is customarily positioned next to the phosphor layer in said screen construction includes volatile organic compounds which migrate into the screen and discolor in the polymer binder of the phosphor layer. Such interraction reduces the screen speed significantly in as short a time duration as a few days and can thereby represent a more serious problem than experienced from phosphor brightness loss attributable to moisture attack. Understandably, these problems are of a different nature since moisture attack produces degradation of the phosphor material itself whereas the discoloration of the phosphor layer produced by volatilized photographic film constituent is limited to discoloration with no loss of phosphor efficiency.

Additional problems are encountered during X-ray screen construction, as hereinafter described in greater detail, if the finely divided phosphor powder material customarily employed is not readily and uniformly dispersible in the liquid coating medium used to prepare the phosphor layer member of the X-ray screen. A free-flowing characteristic of the phosphor powder in the solid state is required in order to uniformly suspend the phosphor powder in this liquid medium and finely divided silica or alumina is generally added to the phosphor powders in order to facilitate more reliable screen manufacture. While the latter class of additives are chemically inert, it is possible that the screen performance could still be impaired if these additives absorb phosphor emission to any significant degree. It can thereby be seen that particulate additives of any kind could have an adverse effect upon the screen performance unless properly selected. Uniform deposition of the individual phosphor particles to form the phosphor screen layer also influences screen performance. Specifically, structural mottle which occurs from uneven exposure of the X-ray film due to uneven lay-down of the phosphor particles in said screen layer can interfere with diagnostic interpretation of the radiogram. Uneven lay-down of the phosphor particles from the orgaic liquid suspending medium now being employed can also arise from a number of causes including flocculation of the phosphor particles in said liquid medium and poor compaction of the phosphor particles after said liquid medium has been removed.

It is desirable, therefore, to solve all of the foregoing problems in a convenient and effective manner which further does not involve any elaborate modification of the present type X-ray screen construction.

SUMMARY OF THE INVENTION

In the present invention, particular additives are used with a rare earth oxyhalide phosphor powder either prior to or during preparation of the X-ray screen. The present additives are soluble trivalent antimony compounds, including organic salts such as potassium antimony tartrate, antimony butoxide and potassium antimony tartrate; as well as inorgaic antimony halides such as antimony chloride and antimony fluoride. Surprisingly, the addition of water soluble trivalent antimony compounds as an aqueous solution to provide a protective coating on the individual phosphor particles provides a phosphor admixture which thereafter resists both moisture attack and discoloration within the adhesively bonded product being employed as the phosphor layer of an X-ray screen as well as imparts free-flowing characteristics to the dry phosphor powder after liquid removal. When the treated phosphor is thereafter suspended in an organic liquid medium for deposition of the X-ray screen layer, there is also less flocculation experienced and a more compact deposition of the phosphor particles takes place therefrom. Solid admixtures obtained by physically mixing the solid additive with the phosphor particles or dissolving said additive in the organic liquid medium produces greater resistance to moisture attack and discoloration but has not been observed to modify either the flow characteristics of the dry phosphor powder or impart more uniform phosphor lay-down. Still, all of the present additives greatly extend the useful life of X-ray intensifying screens to a greater degree than additives disclosed in the aforementioned co-pending patent applications. It also follows from the foregoing observations that useful additives are either water soluble or soluble in the organic liquids employed for the phosphor layer suspension. The present improvements are obtained with varying amounts from a small but effective amount up to about 5% by weight of the soluble additives based on the phosphor weight. Since antimony ion is recognized to absorb X-rays, it is possible to incur screen speed loss if more than about 5% trivalent antimony compound based on the phosphor weight is added for protection.

The class of rare earth oxyhalide phosphors which can be benefitted with the present additives have the structural formula:

$$LnOX:T_x$$

wherein

Ln is one or more of La and Gd,

X is one or more of Cl and Br, and $T_x$ is one or more of $Tb^{3+}$ and $Tm^{3+}$ ion present at activator levels.

Activator levels can be present in conventional amounts which can vary both with respect to a particular single activator ion being employed as well as with coactivation employing both above identified activator ions.

BRIEF DESCRIPTION OF THE DRAWING

The drawing is a cross section of an enlarged view of a typical X-ray intensifying screen utilizing the present invention.

DETAILED DESCRIPTION OF THE INVENTION

The FIGURE shows an arrangement consisting of a double emulsion photographic film which is sandwiched between two X-ray intensifying screens. The screens are constructed of flexible backing member 5, a reflector layer 6, a phosphor layer 7 to which this invention relates, and a transparent top layer 8. It is to be emphasized that the particular construction shown in the FIGURE is merely exemplary and is not intended to be a limitation on the invention. Rather, the invention resides in the preparation of the phosphor to render it moisture-resistant as well as exhibiting improved retention of individual screen speed when employed in an X-ray screen construction. The following discussion will relate to the phosphor which will serve as a phosphor layer such as shown by 7 in this figure.

In the preferred embodiments of the invention, the phosphor LaOBr is activated with thulium ($Tm^{3+}$) and/or terbium ($Tb^{3+}$). The following examples illustrate preferred methods for combining the present additives with the aforementioned phosphor materials in providing X-ray screens having improved moisture resistance and X-ray brightness. Additionally, the surface treatment procedure described in Example 1 below provides free-flowing characteristics to the treated phosphor powder for a still further benefit during X-ray screen construction.

EXAMPLE 1

A typical surface treatment for LaOBr: 0.003 Tm phosphor is accomplished by slurrying 300 grams of said phosphor for approximately one hour in 300 milliliters in a 1% by weight antimony trifluoride water solution. The suspension is thereafter filtered and the filter cake then reslurried in 300 milliliters of isopropanol for approximately 30 minutes. The suspension is again filtered and the filter cake then dried for two hours at approximately 90° C. The dried powder is finely sifted through a 325 mesh screen to provide a free-flowing material which is suitable for use in preparing the improved phosphor layer of an X-ray screen.

A liquid phosphor suspension was prepared having the following formulation:

260 gm. treated LaOBr: $Tm^{3+}$ phosphor powder 6 gm. glycerol monolaurate plasticizer 30 gm. polyvinyl butyral polymer binder 75 gm. methanol 75 gm. methyl ethyl ketone All above ingredients except the polyvinyl butyral polymer binder were milled for about 30 minutes in a quart mill. The polymer binder was added dry and milling continued for another four hours. The suspension was thereafter filtered through a 150 mesh screen and the viscosity thereafter adjusted to 2000 centipoise. A standard doctor blade technique was employed to prepare a phosphor screen layer of approximately 100 micron thickness. A protective top layer having approximately 10 microns thickness was added using a cellulose acetate butyrate binder to produce the final X-ray screen construction.

EXAMPLE 2

2.6 gms of potassium antimony tartrate were added directly to 260 gms of untreated LaOBr $Tm^{3+}$ phosphor already suspended in the same liquid formulation medium disclosed above in Example 1. The phosphor suspension was then prepared as an X-ray screen member using the same method further described in said preceding Example.

MEASUREMENTS OF ACCELERATED HUMIDITY

In order to illustrate the moisture resistance obtained in accordance with both Examples, 2½ inch square screen incorporating the present additives were placed in a humidity chamber being maintained at 100° C. and 100% relaive humidity for accelerated testing conditions. Such exposure is considerably more severe than is encountered at the 20° C. and 50% relative humidity conditions normally experienced in air-conditioned X-ray rooms. Periodically the screens were removed, examined and read for brightness under X-ray excitation at 80 KeV peak. The results are presented in Table I which shows the number of hours for which the brightness was still 100% of original brightness for various additives incorporated by both of the above illustrated methods.

TABLE I

| | Humidity Resistance of LaOBr X-Ray Screens | |
|---|---|---|
| Ex. | Surface Treatment of Phosphor or Addition to Phosphor, as % of Phosphor Weight | Useful Life at 100° C. - 100% RH |
| 3 | None | 1 hour |
| 4 | 1% Antimony Fluoride Treatment (Example 1 method) | 110 |
| 5 | 2% Antimony Fluoride Treatment (Example 1 method) | 110 |
| 6 | 1% Sodium Antimony Fluoride Treatment (Example 1 method) | 10 |
| 7 | 1% Potassium Antimony Tartrate Addition (Example 2 method) | 70 |
| 8 | 1% Antimony Fluoride Addition (Example 2 method) | 10 |
| 9 | 1% Antimony Butoxide Addition (Example 2 method) | 30 |
| 10 | 1% Antimony Chloride Addition (Example 2 method) | 2 |
| 11 | 1% Potassium Antimony Tartrate (Example 1 method) | 1 |

As can readily be observed from the foregoing data in Table I, the improvement provided in moisture resistance of LaOBr was considerable and up to about 100 times that of the untreated phosphor material. The most effective additives were found to be antimony fluoride when used in surface treatment of the phosphor. It can also be noted from the foregoing surface treatments that potassium antimony tartrate using the Example 1 method of admixture provided the least amount of improvement. In evaluating these results, it should further be appreciated that one hour of useful life at the accelerated conditions is equal to about one year at ambient temperature and humidity.

FILM SPEED MEASUREMENTS

Other X-ray screens were constructed in the same general manner above described for examination of resistance to loss in screen speed resulting from discoloration when the phosphor layer remained in continued physical contact with conventional photographic film. Accordingly, said screens were subjected to accelerated test conditions wherein film-screen pairs were placed in a humidity chamber being maintained at 50° C. and 90% relative humidity for a week during which time period the film was changed three times. Interim testing of the exposed film-screen pairs by X-ray brightness measurement in the same manner above described produced results listed in Table II below.

TABLE II

| Example | Surface Treatment of Phosphor or Addition to Phosphor (wt. % of phosphor weight) | Useful Life |
|---|---|---|
| 12 | None | 7 days |
| 13 | 1% Potassium Antimony Tartrate Addition | 40 |
| 14 | 2% Potassium Antimony Tartrate Addition | 49 |
| 15 | 1% Antimony Fluoride Addition | 33 |
| 16 | 1% Sodium Antimony Fluoride Addition | 33 |
| 17 | 1% Ammonium Antimony Fluoride Addition | 24 |
| 18 | 1% Antimony Butoxide Addition | 40 |
| 19 | 1% Antimony Fluoride Treatment | 35 |
| 20 | 2% Antimony Fluoride Treatment | 38 |
| 21 | 1% Ammonium Antimony Fluoride Treatment | 32 |
| 22 | 1% Potassium Antimony Tartrate Treatment | 10 |
| 23 | 1% Antimony Chloride Treatment | 7 |
| 24 | 1% Antimony Chloride Addition | 9 |

The results in Table II above show the useful life of an LaOBr X-ray screen can be increased by factors of 4 to 7 times that of the unmodified phosphor material with small but effective amounts of several trivalent antimony compounds. On the other hand, only phosphors in examples 19–21 exhibited the free-flowing characteristics desired for more reliable X-ray screen construction.

PHOSPHOR DISPERSION MEASUREMENTS

Dispersion measurements were conducted upon the present phosphor materials treated in accordance with the invention. Said measurements demonstrated that phosphors treated with soluble trivalent antimony compounds undergo less flocculation when suspended in the organic liquid media customarily used for X-ray screen preparation than an untreated phosphor. Less flocculation is desirable in promoting greater compaction of the phosphor particles when said liquid media is removed since a reduction in structural mottle should be gained during screen use from a higher degree of phosphor compaction. Accordingly, the settling behavior of various treated phosphors was measured in the conventional manner utilizing calibrated Nessler tubes after suspension of the phosphor powders in methyl ethyl ketone, methanol, or toluene, including mixtures of said organic liquids. Toluene was selected in this evaluation by reason of its known propensity to flocculate LaOBr phosphor particles to a greater degree than does either methanol or methyl ethyl ketone. The settling behavior is reported in Table III as the phosphor height after settling of 10 gms. LaOBr phosphor in 50 milliliters of the particular organic liquid medium.

TABLE III

| Ex. | Surface Treatment of Phosphor or Addition to Phosphor (wt. % of phosphor weight) | Phosphor Height (millimeters) |
|---|---|---|
| 25 | None, Methyl Ethyl Ketone Suspension | 20 |
| 26 | 1% Antimony Fluoride Treatment, Methyl Ethyl Ketone Suspension | 17 |
| 27 | None, Methanol Suspension | 20 |
| 28 | 1% Antimony Fluoride Treatment, Methanol Suspension | 15 |
| 29 | None, Toluene Suspension | 56 |
| 30 | 1% Antimony Fluoride Treatment, Toluene Suspension | 30 |
| 31 | None, Equivolume Toluene/Methanol Suspension | 34 |
| 32 | 1% Antimony Fluoride Treatment, Equivolume Toluene/Methanol Suspension | 19 |
| 33 | 1% Potassium Antimony Tartrate Addition to Methyl Ethyl Ketone Suspension | 19 |
| 34 | 1% Potassium Antimony Tartrate Addition to Methanol Suspension | 20 |

From the measurements reported in Table III above, it can be noted that surface treatment of the phosphor material (as illustrated in Examples 26, 28, 30 and 32) with water soluble antimony fluoride prior to suspension in the organic liquid suspension always produced phosphor compaction. As distinct therefrom, addition of an organic liquid soluble additive, potassium antimony, tartrate, to the phosphor suspension did not produce any appreciable compaction of the phosphor particles deposited therefrom.

It will be apparent from the foregoing description that the present class of additives significantly further extends the life of X-ray screens utilizing rare earth oxyhalide phosphors than has been found possible previously. The protective action afforded with the present additives while not known exactly is believed to involve absorption of antimony ion into the surface of the phosphor particle and with somwe form of chemical interraction taking place that prevents or at least retards subsequent reaction thereafter between the phosphor and migration products present in the binder material in the phosphor layer. It will also be apparent from the embodiments being illustrated that the utilization of the phosphor material in this manner can be carried out as well with the solid additives as well as by liquid treatment. Furthermore, it has been also shown that the surface treatment of the present phosphors with a water soluble trivalent antimony compound as above described provides additional benefits for X-ray screen manufacture and should decrease structure mottle during screen use. It is intended to limit the present invention, therefore, only by the scope of the following claims.

What I claim as new and desire to secure by Letters Patent of the United States is:

1. An improved X-ray screen lincluding a backing member coated with a physical admixture of a rear earth oxyhalide phosphor according to the formula:

$$LnOx:T_x$$

wherein
- Ln is La, Gd, or mixtures thereof,
- X is Cl, Br, or mixtures thereof, and
- $T_x$ is $Tb^{3+}$ or $Tm^{3+}$ ions or mixtures thereof at activator levels, with a water soluble trivalent antimony compound in sufficient quantity from a small but effective amount up to about 5 weight percent based on the phosphor weight to retain original emission brightness where utilized in said X-ray screen for a longer time period than for said phosphor without said water soluble trivalent antimony compound, and with said phosphor admixture being adhesively bonded with a polymer binder to said backing member, and said improved X-ray screen resisting loss in film speed when associated with a photographic film.

2. An improved X-ray screen as in claim 1 wherein said admixture comprises phosphor particles coated with said trivalent antimony compound.

3. An improved X-ray screen as in claim 1 wherein the phosphor is LaOBr.

4. An improved X-ray screen as in claim 1 wherein the trivalent antimony compound is trivalent antimony halide.

5. An improved X-ray screen as in claim 4 wherein the trivalent antimony halide is trivalent antimony fluoride.

* * * * *